3,118,847
POLYOLEFIN COMPOSITIONS OF IMPROVED
TRANSPARENCY
George R. Greear, Roger M. Schulken, Jr., and John W.
Tamblyn, Kingsport, Tenn., assignors to Eastman
Kodak Company, Rochester, N.Y., a corporation of
New Jersey
No Drawing. Filed Feb. 24, 1959, Ser. No. 794,849
13 Claims. (Cl. 260—23)

This invention relates to polyolefin compositions having improved transparency and antiblocking properties and more particularly to polyethylene and polypropylene compositions which contain as antiblocking and transparency improving agents certain selected metal hydroxystearates in the amounts hereinafter disclosed.

This application is a continuation-in-part of our copending application Serial No. 642,666, filed February 27, 1957, now abandoned.

As is well known, fabricated articles of polyethylene are translucent but very hazy. The haze apparently is due to the formation of large crystalline aggregates when the molten polyethylene is cooled. The presence of such aggregates destroys visibility through polyethylene sheets of only moderate thickness and impairs visibility through even thin films of polyethylene.

It is also well known that sheets of untreated polyethylene and polypropylene tend to stick together and block if several sheets are stacked one on one another. This undesirable blocking tendency, of course, hampers the use of these sheets in various processes.

An object therefore of the present invention is to provide a polyolefin composition such as polyethylene and polypropylene having improved transparency and non-blocking characteristics.

A further object of the present invention is to provide a molded or extruded sheet of polyethylene or polypropylene having improved clarity and non-blocking characteristics.

Still another object is to provide a film of polyethylene or polypropylene of high clarity and non-blocking characteristics.

Yet another object is to provide polyethylene and polypropylene sheets from 1 to 500 mils in thickness of improved transparency.

Other objects will appear hereinafter.

In accordance with the present invention, these and other objects are attained by providing a polyolefin composition containing as a non-blocking and transparency improving agent one or more metal salts of 12-hydroxystearates selected from the group consisting of magnesium, lithium, zinc, calcium and barium 12-hydroxystearates. We have found that polyethylene and polypropylene containing one or more of these metal salts of 12-hydroxystearate possess the non-blocking property as well as increase transparency where as if certain other metal hydroxystearates are employed, the transparency property of the composition is disadvantageously lessened. The metal salts of such 12-hydroxystearates may be suitably homogeneously incorporated in the composition as on milling rolls.

The present invention is further described in the following examples.

EXAMPLE 1

A compression molded $\frac{1}{16}$ inch thick sheet of polyethylene was placed on a page of printed matter and observed while being slowly raised away from the page. The print become blurred and illegible before the polyethylene sheet was $\frac{1}{2}$ inch above the printed page. When even larger objects were observed through this sheet, they were completely lost to view and unrecognizable at distances of over 1 inch.

As contrasted to the results found with the above described sheet, a compression molded sheet also $\frac{1}{16}$ inch thick and made from a novel composition of the instant invention was also similarly tested. The sheet contained by weight 100 parts of polyethylene and 5 parts of magnesium 12-hydroxystearate. This sheet could be held over a yard away from the printed page without loss of legibility. Large objects were recognizable at distances over a mile.

1-mil thick extruded films of this latter composition exhibited no blocking when placed one on another at 75° F. for three weeks. On the other hand, the same number of plain polyethylene films blocked badly under this test.

EXAMPLE 2

A compression molded sheet $\frac{1}{16}$ inch in thickness containing by weight 100 parts of polyethylene and 5 parts of lithium salt of 12-hydroxystearate, when similarly tested as in Example 1, had even greater clarity, thin films exhibited no blocking.

EXAMPLE 3

A sheet $\frac{1}{16}$ inch in thickness which was compression molded from 100 parts by weight of polyethylene and 5 parts by weight of zinc salt of 12-hydroxystearate. When tested as in Example 1, it displayed transparencies equal to that of the sheet of Example 1 and had similar non-blocking properties.

EXAMPLE 4

A sheet $\frac{1}{16}$ inch in thickness was compression molded from 100 parts by weight of polyethylene and 5 parts by weight of calcium salt of 12-hydroxystearate. When tested for transparency as in Example 1 it exhibited transparencies equal to that of the polyethylene-magnesium salt of 12-hydroxystearate sheet of Example 1. Thin films exhibited no blocking.

EXAMPLE 5

A sheet $\frac{1}{16}$ inch in thickness was compression molded from 100 parts by weight of polyethylene and 5 parts by weight of barium salt of 12-hydroxystearate. When tested as in Example 1, it displayed transparencies equal to that of the sheet of Example 1 and had similar non-blocking properties.

EXAMPLE 6

Examples 1 to 6 were duplicated using polypropylene in place of polyethylene and the resulting transparencies and non-blocking properties were similar.

It will be understood that in Examples 1 to 6 the compositions are homogeneously mixed before being molded. Any conventional mixing process can be employed including heated milling rolls.

As indicated in the foregoing examples, 100 parts of the polyolefin to 5 parts of the metal salt of 12-hydroxystearate may be advantageously employed. We have found that the increase in transparency of the novel compositions occur most rapidly between 0.1 and 1% by weight of the selected metal salt of 12-hydroxystearate. From 1 to 10% of the additive the further increase in transparency was relatively slight.

While this invention is illustrated with compression molded sheets, we have found that extruded or cast sheets made from the above-described compositions also have improved transparency and are non-blocking.

We have found that extruded films of polyethylene containing optimum amounts of the specified metal salt of 12-hydroxystearates which were extruded at 340° F. have maximum clarity.

The non-blocking sheets are advantageously employed in processes which fabricate the sheets into formed articles. The transparent polyolefin compositions may also be employed in coating paper on which a transparent coating is required.

EXAMPLE 7

Example 1 was repeated by employing polyethylene and polypropylene containing respectively 0.1% and 10% of the metal salt of 12-hydroxystearates selected from the group consisting of magnesium, lithium, zinc, calcium and barium salt of 12-hydroxystearates. In each the compositions were transparent and films made therefrom were non-blocking.

The improvement in transparency appears to be due to the fact that the selected metal salts of the 12-hydroxystearates act as crystallization controllers.

The haze normally present in articles made of polyethylene or polypropylene is caused by aggregates or spherulites of crystalline polymer which have grown to a size large enough to act as light-scattering centers. While still in the molten non-crystalline form, the polymer is completely transparent. During cooling and solidification, the polymer crystallizes. If the crystallization process is rapid enough, no crystal aggregates reach a size great enough to reduce the transparency. We believe that the presence of the selected hydroxystearates in these polymers accelerates the rate of crystallization during cooling, thus producing a more transparent material.

As the thickness of the sheet is reduced, it cools faster because heat can be removed more efficiently. This results in smaller crystal aggregates and better transparency. However, for thickness greater than about 1 mil, the acceleration of crystallization by the recommended hydroxystearates produces a significant improvement in transparency. On the other hand, thick processed articles cool slowly because of the poor heat conductivity of the plastic. Under these conditions, the crystals have time to form large aggregates. Below 500 mils thickness, the beneficial effects of the selected hydroxystearates are appreciable.

Consequently, we have found that our invention operates best in connection with articles within 1 to 500 mils thick. However, these limits are somewhat flexible because different polymers inherently crystalline at slightly different rates and, of course, different processes involve different cooling rates.

The following Table I shows quantitative examples of the large variations in transparency observed when different metal hydroxystearates are incorporated in polyethylene and 1/16 inch thick compression molded plates of the polyethylene-metal stearate are formed therefrom. From this table, it is apparent that not all metal hydroxystearates impart the transparency property to polyethylene.

Table I

| Metal Stearate | Concentration of Stearate (percent by wt.) | Transparency Value (In.) |
| --- | --- | --- |
| None | | 0.0 |
| Magnesium 12-Hydroxystearate | 0.1 | 0.2 |
| Do | 1 | 12 |
| Do | 3 | 18 |
| Do | 5 | 18 |
| Do | 10 | 18 |
| Lithium 12-Hydroxystearate | 1 | 36 |
| Aluminum Dihydroxystearate | 5 | 1 |
| Aluminum Monohydroxystearate | 5 | 0.0 |
| Sodium Stearate | 5 | 0.0 |
| Lithium Ricinoleate | 5 | 0.0 |
| Zinc 12-Hydroxystearate | 5 | 18 |
| Calcium 12-Hydroxystearate | 5 | 18 |
| Barium 12-Hydroxystearate | 5 | 18 |
| Zinc Stearate | 5 | 0.5 |

The transparency values listed in the table represent the distance in inches beyond which a printed sheet became illegible when viewed through 1/16 inch thick compression-molded plates of the polyethylene-metal stearate compositions. The polyethylene plate was held one foot from the eye and the printed sheet behind was gradually moved back until the print could no longer be read. The transparency value was then the distance between plate and print.

We claim:

1. A transparent, non-blocking polyolefin composition consisting of a polyolefin selected from the group consisting of polyethylene and polypropylene and 0.1% to 10% by weight of a metal salt of 12-hydroxystearate selected from the group consisting of magnesium, lithium, zinc, calcium and barium salts of 12-hydroxystearate.

2. A transparent, non-blocking polyolefin composition consisting of polyethyelne and 0.1% to 10% by weight of lithium salt of 12-hydroxystearate.

3. A transparent, non-blocking polyolefin composition consisting of polyethylene and 5% by weight of lithium salt of 12-hydroxystearate.

4. A transparent, non-blocking polyolefin composition consisting of polypropylene and 0.1% to 10% by weight of lithium salt of 12-hydroxystearate.

5. A transparent, non-blocking polyolefin composition consisting of polypropylene and 5% by weight of lithium salt of 12-hydroxystearate.

6. A transparent, non-blocking polyolefin composition consisting of polyethylene and 5% by weight of magnesium salt of 12-hydroxystearate.

7. A transparent, non-blocking polyolefin composition consisting of polyethyelne and 5% by weight of zinc salt of 12-hydroxystearate.

8. A transparent, non-blocking polyolefin composition consisting of polyethylene and 5% by weight of calcium salt of 12-hydroxystearate.

9. A transparent, non-blocking polyolefin composition consisting of polyethylene and 5% by weight of barium salt of 12-hydroxystearate.

10. A transparent, non-blocking polyolefin sheet consisting of polyethylene and 5% by weight of lithium salt of 12-hydroxystearate.

11. A transparent, non-blocking polyolefin sheet consisting of polyethylene and 5% by weight of magnesium salt of 12-hydroxystearate.

12. A transparent, non-blocking polyolefin sheet consisting of polypropylene and 5% by weight of lithium salt of 12-hydrostearate.

13. A transparent, non-blocking polyolefin sheet consisting of polypropylene and 5% by weight of magnesium salt of 12-hydroxystearate.

References Cited in the file of this patent

UNITED STATES PATENTS

| | | |
| --- | --- | --- |
| 2,448,799 | Happoldt | Sept. 7, 1948 |
| 2,462,331 | Myers | Feb. 22, 1949 |
| 2,655,492 | Young et al. | Oct. 13, 1953 |
| 2,728,735 | Anderson | Dec. 27, 1955 |
| 2,737,502 | Land et al. | Mar. 6, 1956 |